US005641846A

United States Patent [19]
Bieringer et al.

[11] Patent Number: 5,641,846
[45] Date of Patent: Jun. 24, 1997

[54] SIDE-GROUP POLYMERS, AND THEIR USE FOR OPTICAL COMPONENTS

[75] Inventors: Thomas Bieringer, Bindlach; Uwe Gessner, Berlin; Dietrich Haarer, Bayreuth; Joachim Rübner, Berlin; Roland Wuttke, Bayreuth; Uwe Claussen, Leverkusen; Ralf Ruhmann, Berlin; Horst Berneth, Leverkusen; Sergei Kostromin, Swisttal-Buschhoven; Ralf Neigl, Kürten-Eichhof, all of Germany

[73] Assignee: Bayer Aktiengesellschaft, Leverkusen, Germany

[21] Appl. No.: 532,129

[22] Filed: Sep. 22, 1995

[30] Foreign Application Priority Data

Sep. 30, 1994 [DE] Germany .................. 44 34 966.1

[51] Int. Cl.[6] .................................. C08F 220/36
[52] U.S. Cl. .................... 526/292.2; 526/292.3; 526/312; 526/313; 526/298; 526/311; 526/288; 526/245; 526/243; 526/263; 526/279; 526/289; 526/301; 526/302; 526/304; 252/299.01; 430/270.14; 430/19
[58] Field of Search ............... 526/298, 292.2, 526/292.3, 312, 313; 252/299.01; 430/19, 270.14

[56] References Cited

U.S. PATENT DOCUMENTS

| | | | |
|---|---|---|---|
| 4,631,328 | 12/1986 | Ringsdorf et al. | 526/259 |
| 4,925,589 | 5/1990 | Lorenz | 252/299.01 |
| 4,943,617 | 7/1990 | Etzbach et al. | 525/329.9 |
| 5,023,859 | 6/1991 | Eich et al. | 365/113 |
| 5,098,978 | 3/1992 | Riepl et al. | 528/15 |
| 5,310,837 | 5/1994 | May | 526/245 |
| 5,384,378 | 1/1995 | Etzbach et al. | 526/256 |
| 5,543,267 | 8/1996 | Stumpe et al. | 430/290 |

FOREIGN PATENT DOCUMENTS

| | | |
|---|---|---|
| 0230898 | 8/1987 | European Pat. Off. . |
| 0322708 | 7/1989 | European Pat. Off. . |
| 0538773 | 4/1993 | European Pat. Off. . |
| 0590421 | 4/1994 | European Pat. Off. . |
| 0659865 | 6/1995 | European Pat. Off. . |
| 276297 | 2/1990 | Germany . |
| 887574 | 12/1981 | U.S.S.R. . |
| 2246138 | 1/1992 | United Kingdom . |
| 9112280 | 8/1991 | WIPO . |

OTHER PUBLICATIONS

M. Eich, et al., Makromol. Chem., Rapid Commun., vol. 8, pp. 467–471, (1987).

K. Anderle, et al., Makromol. Chem., Macromol. Symp., vol. 44, pp. 11–22, (1991).

S. Ivanov, et al., Makromol. Chem., Rapid Commun., vol. 12, pp. 709–715, (1991).

K. Anderle, et al., Makromol. Chem., Rapid Commun., vol. 10, pp. 477–483, (1989).

A. Natansohn, et al., Macromolecules, vol. 25, pp. 2268–2273, (1992).

H. Ringsdorf, et al., Makromol. Chem., vol. 185, pp. 1327–1334, (1984).

A. Akelah, Eur. Polym. J., vol. 18, pp. 559–561, (1982).

S.G. Kostromin, et al., Liquid Crystals, vol. 2, No. 2, pp. 195–200, (1987).

A. Natansohn, et al., Macromolecules, vol. 25, pp. 5531–5532, (1992).

H. Ringsdorf (1984) Makromol. Chem. 185, 1327–1334.

M. Portugall et al. (1982) Makromol. Chem. 183, 2311–2321.

RT Morrison & R.N. Boyd, Organic Chemistry, 3d Ed., Allyn and Bacon, Inc., Boston, 1973, 658–9.

Primary Examiner—Mark Nagumo
Attorney, Agent, or Firm—Sprung Horn Kramer & Woods

[57] ABSTRACT

Side-group polymers whose permanently shape-anisotropic side groups carry lateral substituents are particularly suitable, owing to their excellent properties, for optical components which can be employed, in particular, in optical data storage and transfer.

7 Claims, No Drawings

SIDE-GROUP POLYMERS, AND THEIR USE FOR OPTICAL COMPONENTS

Background of the Invention

1. Field of the Invention

The invention relates to side-group polymers containing side groups whose configuration can be changed induced by light and permanently shape-anisotropic side groups, and to the use of these side-group polymers for optical components, in particular in optical data storage and transfer. Before irradiation, the novel side-group polymers in the glass state of the polymers are optically isotropic, amorphous, transparent and do not scatter light. Irradiation in the glass state causes, induced by light, an alignment of the side groups, causing the side-group polymers to become birefringent and dichroic without losing their transparency; in addition, the light scattering properties change. The light-induced optical anisotropy can be reversibly modified or eliminated thermally or by re-irradiation.

The side-group polymers are suitable for the storage of optical information and for the production of passive or optically switchable components.

2. Description of the Related Art

The literature discloses various polymers containing photochromic groups whose optical properties, such as absorption, emission, reflexion, birefringence or scattering, are reversibly modified by means of photoinduced physical and/or chemical processes. An interesting and novel method for reversibly modifying the optical properties of polymers is the photoinduced variation of the degree of ordering, the alignment direction and the alignment distribution or the morphology of the polymers by various processes. Photoinduced modification of the ordering in the polymers is used for storage of information.

Thus, Eich and Wendorff (Makromol. Chem., Rapid Commun. (1987) 8, 467) describe liquid-crystalline polymers containing azobenzene groups. These form liquid-crystalline domains in which the action of light only realigns those groups which have previously undergone an isomerization reaction (Anderle, Birenheide, Wendorff, Makromol. Chem., Macromol. Symp. 44, 11–22 (1991)). The storage effect is based on the interference in the ordered state of the monodomains by the realignment of the photochromic side groups in an otherwise rigid matrix.

In addition, liquid-crystalline polymers have recently been disclosed in which photochemical realignment of the photochromic groups also causes cooperative realignment of non-photochromic groups, so that the optical axis of the monodomains is rotated (Ivanov, Yakovlev, Kostromin, Shibaev, Läsker, Stumpe, Kreysig, Makromol. Chem., Rapid Commun. 12, 709–715 (1991)).

The severe applicational disadvantage of the liquid-crystalline systems is that their use generally requires a perfect, macroscopically uniform alignment by external fields and/or surface effects to give a monodomain.

The alignment of liquid-crystalline polymers by electric and magnetic fields and by mechanical forces and surface effects is extremely complex technologically, so that broad application of such liquid-crystalline polymers has hitherto not been possible.

It has furthermore been found that birefringence can in principle be induced in an amorphous system (Anderle, Birenheide, Eich, Wendorff, Makromol. Chem., Rapid, Comm. (1989) 10, 477ff and EP 335 302). However, the effect is some orders of magnitude weaker than that obtained from a liquid-crystalline monodomain and for this reason cannot be used industrially.

It is furthermore known (Natansohn, Rochon, Gosselin, Xie, Macromolecules 25, 2268–2273 (1992)) that certain homopolymers can form anisotropic properties on irradiation with light.

A system of this type is structurally invariant, is not stable in the long term and is fixed in its properties within broad limits. A particular advantage of copolymers over homopolymers is precisely their structural flexibility, which allows adaptation of the properties to the particular application with retention of the information-storing properties.

An advantageous system for the utility of photoaddressable materials in industry would be one which is on the one hand optically isotropic, amorphous and homogeneous and on the other hand has the excellent dichroic and birefringent properties of a liquid-crystalline polymer, in combination with a certain bandwidth in the structure variation in order to be able to match the other properties of the material to the particular technical requirements.

SUMMARY OF THE INVENTION

The object of the invention was to provide a system which on the one hand gives an optically isotropic two-dimensional structure and on the other hand becomes, on exposure to light, dichroic and birefringent to an extent as known from very good liquid-crystalline systems.

This object is achieved by side-group polymers which contain certain photochromic side groups and certain permanently shape-anisotropic side groups having high anisotropy of the molecular polarizability which, in contrast to photochromic liquid-crystalline polymers known hitherto and solution variants which have been described, can be converted easily and in a technologically variable manner, into an optically isotropic, transparent, amorphous state which does not scatter light.

The invention thus relates to polymers having a poly (meth)acrylate main chain acting as backbone and, branching off therefrom, covalently bonded side groups of at least one structure under the following formulae:

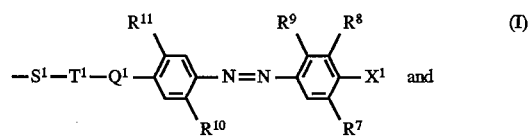

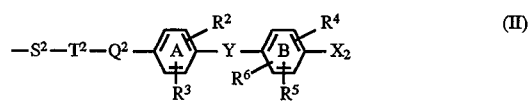

in which $S^1$ and $S^2$ independently of one another are O or S atoms or the $NR^1$ radical, $R^1$ is hydrogen, $C_1$–$C_6$-alkyl or phenyl, $T^1$ and $T^2$ independently of one another are the $(CR^1, R^{12})_n$ radical, which can optionally be interrupted by —O—, —S—, —$NR^1$— or —$OSiR^1{}_2O$—, n is an integer from 2 to 12, $Q^1$ and $Q^2$ independently of one another are —O—, —COO—, —OCO—, —$CONR^1$—, —$NR^1CO$—, $NR^1$—, —O—$C_6H_4$—COO— or —O—$C_6H_4$—$CONR^1$—, whereby additionally the combinations $S^1R^1Q^1$ and $S^2T^2Q^2$ independently of one another can be

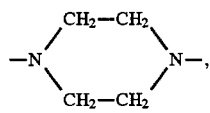

R² to R⁶ independently of one another are hydrogen, halogen, $C_1$-$C_4$-alkyl, $C_1$-$C_4$-alkoxy, $CF_3$, nitro, $SO_2CH_3$, $SO_2NH_2$ or cyano, where at least one of the substituents R² to K⁶ must be other than hydrogen, R⁷ to R⁹ independently of one another are hydrogen, $C_1$-$C_6$-alkyl, hydroxyl, $C_1$-$C_6$-alkoxy, phenoxy, $C_1$-$C_6$-alkylthio, phenylthio, halogen, $CF_3$, $CCl_3$, $CBr_3$, nitro, cyan, $C_1$-$C_6$-alkylsulfonyl, phenylsulfonyl, $COOR^1$, aminosulfonyl, $C_1$-$C_6$-alkylaminosulfonyl, phenylaminosulfonyl, aminocarbonyl, $C_1$-$C_6$-alkylaminocarbonyl, phenylaminocarbonyl, R¹⁰ is hydrogen, halogen, $C_1$-$C_6$-alkyl, hydroxyl, $C_1$-$C_6$-alkoxy, phenoxy, $C_1$-$C_4$-acylamino, $C_1$-$C_4$-alkylsulfonylamino, R¹¹ is hydrogen, halogen, $C_1$-$C_6$-alkyl, hydroxyl, $C_1$-$C_6$-alkoxy, phenoxy, Y is a direct bonding, —COO—, —OCO—, —CONH—, —NHCO—, —O—, —NH—, or —N(CH₃), and X¹ and X² independently of one another are hydrogen, hydroxyl, mercapto, $CF_3$, $CCl_3$, $CBr_3$, halogen, cyan, nitro, $COOR^1$, $C_{1-C6}$-alkyl, $C_5$-$C_{12}$-cycloalkyl, $C_1$-$C_{12}$-alkoxy, $C_1$-$C_{12}$-alkylthio, $C_{6-C12}$-aryl, $C_6$-$C_{12}$-aryloxy, $C_6$-$C_{12}$-arylthio, $C_1$-$C_6$-alkylsulfonyl, $C_6$-$C_{12}$-arylsulfonyl, aminosulfonyl, $C_1$-$C_6$-alkylaminosulfonyl, phenylaminosulfonyl, aminocarbonyl, $C_1$-$C_6$-alkylaminocarbonyl, phenylaminocarbonyl, $NR^{12}$, $R^{13}$, $NH-CO-R^{12}$, $NH-SO_{2-R}{}^{12}$, $NH-CO-NR^1$, $R^2$, $NH-CO-O-R^{12}$ or $SO_2-CF_3$, wherein $R^{12}$ and $R^{13}$ independently of one another are hydrogen, $C_1$-$C_4$-alkyl or phenyl, with the proviso that, if R⁷ to R¹¹ denote hydrogen and ring B is substituted by $C_1$-$C_4$-alkyl, $C_1$-$C_4$-alkoxy, nitro or cyano, at least one second substituent is also present in the ring A –Y–ring B system.

DETAILED DESCRIPTION OF THE INVENTION

The preferred novel polymers contain exclusively recurring units containing the side groups I and II, preferably those of the formulae

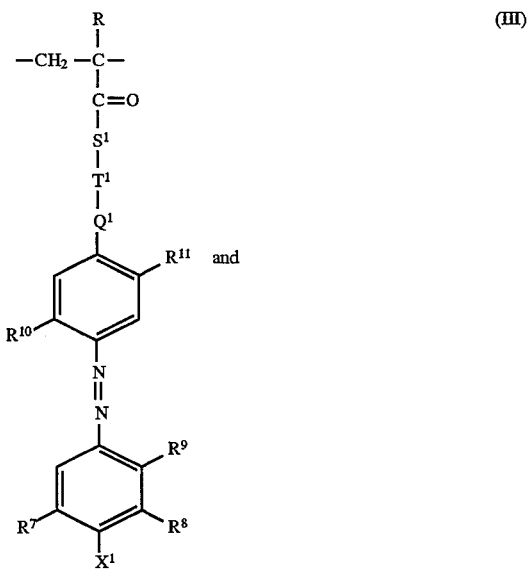

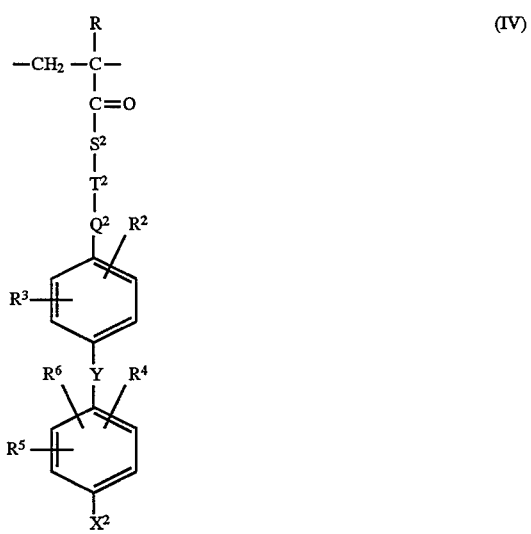

in which R is H or methyl. Preferred examples of the groups T¹ and T² are independently of one another

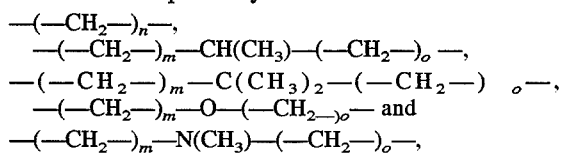

wherein n is an integer from 2 to 6, and m and o independently of one another are integers from zero to 2, the sum of which is at least 1.

Preferred monomers for the introduction of the side group I conform to the formula

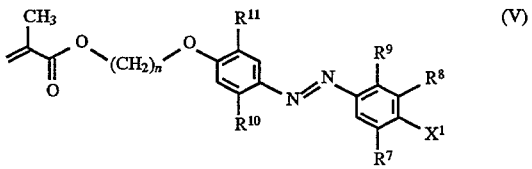

in which $X^1$ and $R^7$ to $R^{11}$ is as defined above and n is an integer from 2 to 10, preferably from 4 to 6. Examples of such monomers are

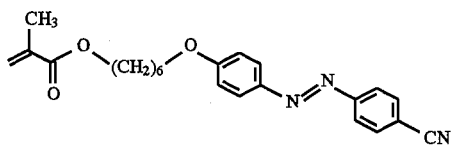 (VI)

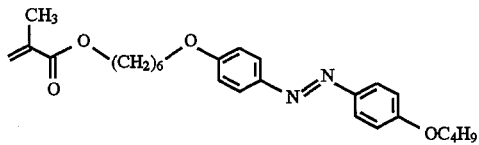 (VII)

Other preferred monomers for the introduction of the side group I conform to the formula

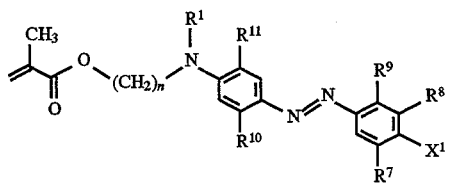 (XIII)

wherein $R^1$, $X_1$ and $R^7$ to $R^{11}$ have the above mentioned meanings and n denotes an integer of from 2 to 10, preferably from 4 to 6.

Examples of such monomers are

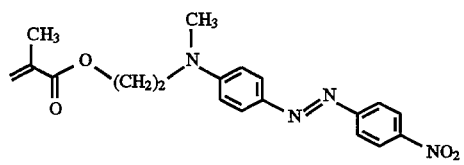 (XIV)

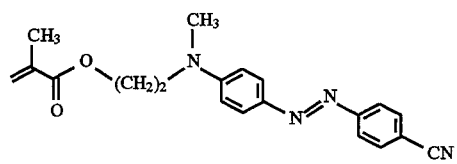 (XV)

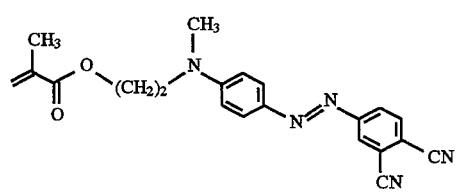 (XVI)

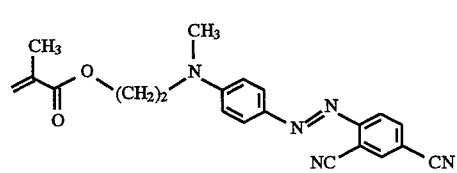 (XVII)

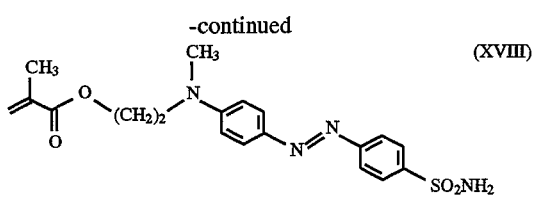 (XVIII)

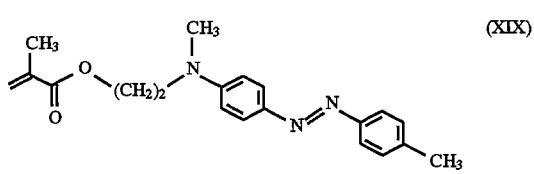 (XIX)

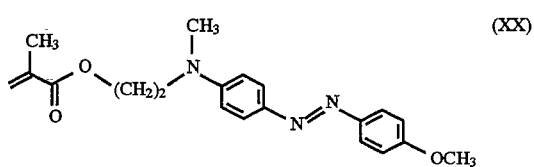 (XX)

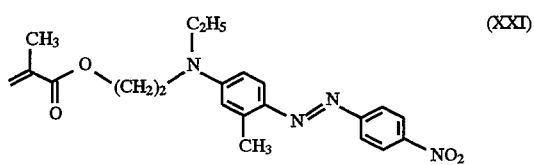 (XXI)

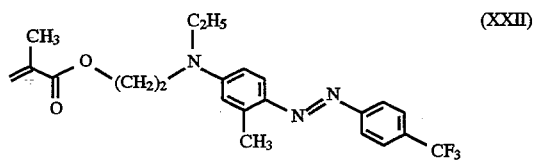 (XXII)

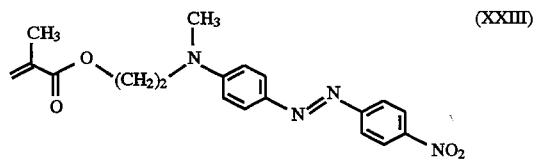 (XXIII)

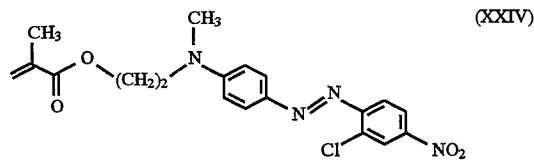 (XXIV)

Particularly preferred side groups II are those of the formula

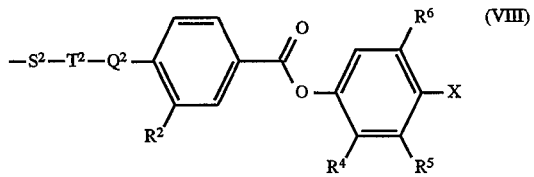 (VIII)

in which $X^2$, $T^2$, $Q^2$ and $R^2$ to $R^6$ are as defined above. Preferred monomers for the introduction of the side groups II conform to the formula

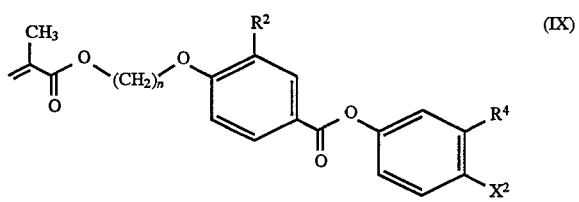

in which n is an integer from 2 to 6, $R^2$ and $R^6$ independently of one another are H, F, Cl, Br, OH, $OCH_3$, $CH_3$, $CF_3$, $NO_2$ or CN, at least one of the substituents $R^2$ and $R^6$ must be other than H, and $X^2$ is H, F, Cl, Br, CN, $NO_2$, $COOR^1$, $C_6$–$C_{12}$–cycloalkyl $C_1$–$C_{12}$–alkoxy or $C_6$–$C_{12}$–aryl. Examples of such monomers are

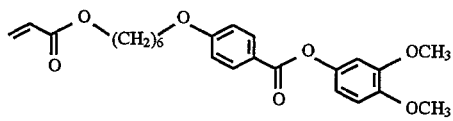 (X)

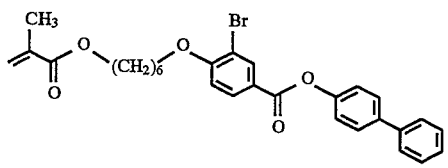 (XI)

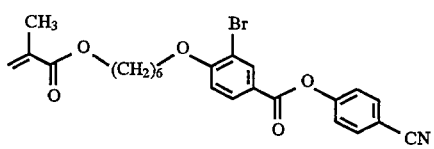 (XII)

The main chain of the side-group polymers is preferably formed by monomers carrying the side groups (I), by monomers carrying the side group (II) and optionally by further monomers, where, in particular, the proportion of the monomers containing the side group (I) is from 25 to 80 mol %, preferably from 30 to 70 mol %, the proportion of the monomers containing the side group (II) is from 20 to 75 mol %, preferably from 30 to 70 mol %, and the proportion of the further monomers is from 0 to 50 mol %, in each case based on the total of all incorporated monomer units.

Suitable "further" recurring units are all units which can be incorporated chemically into the side-group polymer. They essentially serve merely to reduce the concentration of the side groups I and II in the polymer and thus cause as it were a "dilution" effect. In the case of poly(meth)acrylates, the "further" monomers include ethylenically unsaturated, copolymerizable monomers, preferably carrying α-substituted vinyl groups or β-substituted allyl groups, preferably styrene; but also, for example, ring-chlorinated and ring-alkylated or ring-alkenylated styrenes, where the alkyl groups can contain 1 to 4 carbon atoms, such as, for example, vinyltoluene, divinylbenzene, α-methylstyrene, tert-butylstyrenes and chlorostyrenes; vinyl esters of carboxylic acids having 2 to 6 carbon atoms, preferably vinyl acetate; vinylpyridine, vinylnaphthalene, vinylcyclohexane, acrylic acid and methacrylic acid, and/or esters thereof, preferably vinyl, allyl and methallyl esters having 1 to 4 carbon atoms in the alcohol component, and amides and nitriles thereof, maleic anhydride, maleic monoesters and maleic diesters having 1 to 4 carbon atoms in the alcohol component, maleic monoamides and diamides and cyclic imides, such as N-methylmaleiimide or N-cyclohexylmaleiimide; allyl compounds, such as allylbenzene and allyl esters, such as allyl acetate, diallyl phthalate, diallyl isophthalate, diallyl fumarate, allyl carbonates, diallyl carbonates, triallyl phosphate and triallyl cyanurate.

Preferred "further" monomers conform to the formula

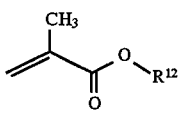

in which $R^{12}$ is an optionally branched $C_1$–$C_6$–alkyl radical or a radical containing at least one further acrylic radical.

The novel polymers also can contain more than one side group falling under the definition of (I), or more than one side group falling under the definition of (II), or several side groups as well of the definition of (I) as of (II). In case of the presence of side chains of the structure (I) and (II), in advantageous manner, at least one of the groups $Q^1$ and $Q^2$, respectively, has the meaning of —O—$C_6H_4$—COO— or —O —$C_6H_4$—$CONR^1$ —.

The novel polymers preferably have a glass transition temperature Tg of at least 40° C. The glass transition temperature can be measured, for example, by the method of B. Vollmer, Grundriß der Makromolekularen Chemie, pp. 406 to 410, Springer-Verlag, Heidelberg, 1962.

The novel polymers generally have a weight-average molecular weight of from 5000 to 2,000,000, preferably of from 8000 to 1,500,000, determined by gel permeation chromatography (calibrated with polystyrene).

The structural units of high shape anisotropy and high anisotropy of the molecular polarizability are the prerequisite for high values of the optical anisotropy. Through the structure of the polymers, the intermolecular interactions of the structural units (I) and (II) are adjusted so that the formation of liquid-crystalline ordered states is suppressed and optically isotropic, transparent, non-scattering films can be produced. On the other hand, the intermolecular interactions are nevertheless strong enough for a photochemically induced, cooperative, targeted realignment process of the photochromic and non-photochromic side groups to occur on irradiation with polarized light.

It is preferred that interactions occur between the side groups (1) and (II) which are sufficient for the photoinduced change in configuration of the side group (I) to cause a realignment in the same direction (known as a cooperative realignment) of the side group (II).

Extremely high values of the optical anisotropy can be induced in the optically isotropic amorphous photochromic polymers (Δn =0.01 to 0.2, preferably 0.01 to 0.1). The values are comparable to those obtained in monodomains of liquid-crystalline polymers, or are even larger than these. They are significantly larger than amorphous polymers not containing these structural units.

Ordered states are generated and modified in the side-group polymers through the effect of actinic light and their optical properties are thus modulated.

The light used is preferably linear-polarized light whose wavelength is in the region of the absorption band of the side groups (I) whose configuration can be changed induced by light.

The side-group monomers can be prepared and polymerized by processes known from the literature (for example DD 276 297, DE 3 808 430, Makromolekulare Chemie 187, 1327–1334 (1984), SU 887 574, Europ. Polym. 18, 561 (1982) and Liq. Cryst. 2, 195 (1987)).

Isotropic films are produced without complex alignment processes utilizing external fields and/or surface effects. They can be applied to substrates by spincoating, dipping, casting or other industrially readily controllable coating methods, introduced between two transparent plates by pressing or inflow or prepared simply as a self-supporting film by casting or extrusion. Such films can also be produced from liquid-crystalline polymers containing the structural units in the sense described by sudden cooling, i.e. by a cooling rate of >100K/min, or by rapid stripping-off of the solvent.

The film thickness is preferably between 0.1 μm and 1 mm, in particular between 0.5 and 100 μm.

The light-induced alignment of the side groups or the writing of information is carried out by irradiation with actinic light suitable for the group whose configuration can be changed induced by light. This results in angle-dependent photoselection, which causes realignment of the photochromic groups and—through a cooperative effect—a continuous realignment of the permanently shape-anisotropic side groups in the same direction, at the most as far as perpendicularly to the electrical vector of the excitation light.

The exposure to light can be carried out over the entire area or locally with linearpolarized, coherent or non-coherent, monochromatic light whose wavelength is in the absorption region of the side groups whose configuration can be changed induced by light.

The information can be written in dot form using a laser or in unstructured form over the entire area using a laser or lamp, or using a mask or by writing a holographic refractive index grating at an intensity of from 0.1 to 5000 mW/cm$^2$ in a time between 0.1 and 6000 sec.

The realignment process is extremely effective. The change in birefringence Δn achievable below the Tg is preferably from 0.01 to 0.20, preferably from 0.05 to 0.10.

The high values for the photochemically induced birefringence and photo-chemically induced dichroism result from the molecular structure of the side groups, the cooperative mechanism of light-induced alignment to give a state of identical macroscopic alignment of the photochromic and nonphotochromic, but permanently shape-anisotropic side groups.

The preferential alignment is freely selectable; it depends merely on the choice of the direction of the electric vector of the excitation light with reference to the polymer article. At constant temperature and wavelength, the extent of the alignment is dependent merely on the incident energy, which can be varied either via the time or, within certain limits, the output of the light source. The alignment, the birefringence and the dichroism are thus freely selectable parameters which can be reproduced precisely on repeated writing and erasing under constant boundary conditions.

A reproducible, defined, continuously variable, long-term-stable birefringence can be produced in the side-chain polymers. It can be displayed in transmitted, polarized light as defined contrast. When polymers whose side groups have dichroic properties are used, reproducible, defined and continuously variable dichroism of the absorption or emission can be produced correspondingly. Uniform irradiation conditions give a uniform alignment in the polymer film as a whole. On local variation of the irradiation conditions, such as energy dose and polarization direction, a film structured with respect to the preferential alignment of the side groups is produced, resulting in pixels of different optical anisotropy.

The preferential direction in the alignment distribution of the optically anisotropic film can be annulled by exposure with unpolarized actinic light and the optical isotropy along the surface normals restored. Re-irradiation with the same source, but with a modified position of the electric vector with reference to the polymer film results in a modification of the direction and magnitude of the optical anisotropy. In this way, repeated switching between different states with respect to direction and magnitude of the optical anisotropy is possible.

Based on these effects, the polymers described are in principle a medium for reversible, optical data storage. As in the production of the films, all measures for restoration of the monodomains are again unnecessary after erasure of the information.

The polymers can be used for digital or analog data storage in the broadest sense, for example for optical signal processing, for Fourier transformation and convolution or in the coherent optical correlation technique. The lateral resolution is limited by the wavelength of the reading light. It allows a pixel size of from 1 to 100 μm.

This property makes the polymers particularly suitable for the processing of images and for information processing by means of holograms, reproduction of which can be carried out by exposure to a reference beam. The interference pattern of two monochromatic, coherent light sources having a constant phase ratio can be stored analogously and a higher storage density obtained through the correlation between the electric vector of the light and the associated preferential direction in the storage medium. Three-dimensional holographic images can be stored correspondingly. Reading takes place by illumination of the hologram with monochromatic, coherent light. In the case of analog storage, grey scale values can be established continuously and with local resolution. Reading of information stored in analog form is carried out in polarized light, giving the positive or negative image, depending on the position of the polarizers. In this case, one possibility is to utilize the film contrast produced by means of the phase shift of the ordinary and extraordinary beam between two polarizers, the planes of the polarizer advantageously forming an angle of 45° to the polarization plane of the writing light, and the polarization plane of the analyser being either perpendicular or parallel to that of the polarizer. Another possibility is to detect the deflection angle of the reading light caused by induced birefringence.

The polymers can be used as optical components which can be switched passively or optically. Thus, the high light-induced optical anisotropy can be utilized to modulate the intensity and/or polarization state of light. Correspondingly, components having imaging properties comparable to lenses or gratings can be produced from a polymer film by holographic structuring. The polymers can further be employed for the production of polarizers.

The invention thus furthermore relates to the use of these polymers for optical components. As such optical components also polarizers can be regarded.

The novel polymers can be prepared in a conventional manner by free-radical copolymerization with the monomers in suitable solvents, such as, for example, aromatic hydrocarbons, such as toluene or xylene, halogenated aromatic hydrocarbons, such as chlorobenzene, ethers, such as tetrahydrofuran and dioxane, ketones, such as acetone and cyclohexanone and/or dimethylformamide, in the presence of polymerization initiators which supply free radicals, such as, forexample, azobisisobutyronitrile or benzoyl peroxide, at elevated temperatures, in general at from 30° to 130° C., preferably at from 40° to 70° C., if possible in the absence of water and air. They can be isolated by precipitation using suitable agents, for example methanol. The products can be purified by reprecipitation, for example using chloroform/methanol.

The novel polymers can form self-supporting films.

However, they are preferably applied to support materials. This can be carried out by various techniques known per se, the method being selected depending on whether a thick or thin coating is desired. Thin coatings can be produced, for example, by spin coating or knife coating from solutions or melts, while thicker coatings can be produced from prefabricated cells, by melt pressing or by extrusion.

The percentages in the examples below in each case relate—unless stated otherwise—to the weight.

EXAMPLES

Monomer 1

Preparation of 3-bromo-4-[6-(2-methylpropenoyl)hexoxy]benzoic acid

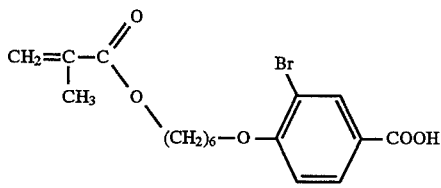

217 g. (1 mol) of 3-bromo-4-hydroxybenzoic acid are introduced into 350 ml of ethanol, and a solution of 150 g of potassium hydroxide and 150 ml of water is added dropwise, during which the mixture warms to 52° C. About 0.2 g of potassium iodide are added to the clear solution, and 150.2 g. (1.1 mol) of chlorohexanol are subsequently added dropwise over the course of one hour. The mixture is subsequently refluxed for 15 hours. The solution becomes dark brown. Crystals are deposited. The mixture is evaporated on a rotary evaporator. 1.5 l of water are added to the residue. The solution, which is then clear, is washed by shaking 3 times with 200 ml of ether. Acidification of the aqueous phase using hydrochloric acid causes precipitation of the product, which crystallizes on extended standing. Filtration with suction, washing three times with 500 ml of water in each case and drying in air give 271 g of 3-bromo-[4-(6-hydroxy)hexoxy]benzoic acid as crude product. Recrystallization from 1.5 l of ethanol/1.5 l of water (filtration over Al₂O₃) and thin-layer chromatography give a pure acid having a melting point of 105° C. to 108° C. 101.5 g (0.28 mol) thereof, 241 g. (2.8 mol) of methacrylic acid, 5 g of hydroquinone and 5 g of p-toluenesulphonic acid are heated to the boil with stirring in 200 ml of chloroform. The water of the reaction is removed from the reaction mixture as an azeotrope with chloroform. After 4 hours, about 10 ml of water have been removed from the reaction mixture. The reaction solution is washed 3 times with 300 ml of water and dried over sodium sulphate. Chloroform is then stripped off at up to 40° C. at 12 mmHg. On cooling, the crude product crystallizes. In order to remove the methacrylic acid which remains, the product is recrystallized from 1.25 l of cyclohexane (filtration through Al₂O₃). In order to produce a product which is pure when analyzed by thin-layer chromatography, further recrystallization of 70 g of product from the first purification step using 1.2 l of cyclohexane (filtration through Al₂O₃) is necessary. Finally, 40 g of 3-bromo-4-[6-(2-methylpropenoyl)hexoxy]benzoic acid are obtained.

m.p.: 99.3° C.

Monomer 2

Preparation of 4'-cyano-2',6'-dibromophenyl 3-bromo-4-[6-(2-methylpropenoyl)hexoxy]benzoate

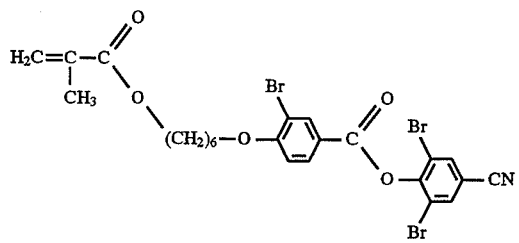

A spatula tip of di-tert-butylphenol, 16 ml of thionyl chloride and 1 drop of dimethylformamide are added to 9.25 g. (0.024 mol) of the acid (monomer 1). The mixture is stirred at room temperature for 30 minutes, forming a clear solution, from which excess thionyl chloride is removed by distillation, initially in a water-pump vacuum and subsequently in an oil-pump vacuum. The residue is then taken up in 40 ml of absolute ether, and a few flakes are filtered off. The etherial solution is added dropwise over the course of 30 minutes to a mixture, held at from 0° to 5° C., of 6.65 g. (0.024 mol) of bromoxinil (=3,5-dibromo-4-hydroxybenzonitrile), 10 ml of absolute tetrahydrofuran and 4 ml of triethylamine. After the mixture has been stirred at room temperature for 5 hours and left to stand for 12 hours, the solvent is removed by distillation in vacuo. The residue is taken up in chloroform, washed 3 times with water, dried over sodium sulphate, filtered and evaporated to dryness. The crude product is dissolved in a little methylene chloride. The solution is transferred onto a silica gel column. With methylene chloride as eluent, 7 fractions are obtained. The residues from the fractions are recrystallized from n-heptane/Al₂O₃. The monomer is then pure when analyzed by thin-layer chromatography.

Yield: 6.9 g.

m.p.: 111.6° to 112.3° C.

Polymer 1 (Comparison)

Polymerization of monomer 2

2 g of monomer 2 and 0.0052 g of azobisisobutyronitrile (1 mol %) are dissolved in 20 ml of freshly distilled tetrahydrofuran in a twin-jacket flask with magnetic stirrer. The solution is flushed with nitrogen for 60 minutes and then warmed to 55° C. The polymerization is carried out under nitrogen. After 24 hours, the polymerization is terminated by pouring the solution into 200 ml of ethanol. The precipitate is filtered off with suction and dissolved in 20 ml of tetrahydrofuran. On pouring into 250 ml of ethanol, the purified polymer precipitates, and is filtered off with suction and dried to a constant weight at 40° C. under reduced pressure.

Yield: 1.6 g.

The polymer is not liquid-crystalline. Its melting point is measured as being 128° C. DSC analysis gives a glass transition temperature of 83° C. The molecular weights, determined by osmometry and chromatography, are Mw =4.6–10⁵ g/mol, Mn =1.1–10⁵ g/mol.

Monomer 3

Preparation of 4'-methoxyphenyl 3-bromo-4-[6-(2-methylpropenoyloxy)hexoxy]- benzoate

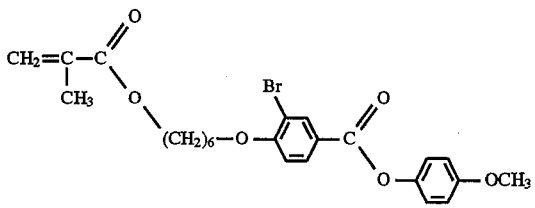

About 0.05 g of di-tert-butylphenol, 50 ml of thionyl chloride and 2 drops of DMF are added to 28 g. (0.073 mol) of the acid (=monomer 1). The mixture is stirred at room temperature for 30 minutes. The excess thionyl chloride is removed from the clear solution by vacuum distillation at room temperature; the residue is dissolved in 100 ml of toluene, and any flakes which precipitate are subsequently removed by filtration. The solution is added dropwise at 55° C. over the course of 30 minutes to a mixture of 9.03 g. (0.073 mol) of p-methoxyphenol and 12 ml of triethylamine in 300 ml of toluene. The mixture is stirred at 55° C. for about 3 hours. The reaction is monitored by thin-layer chromatography. The precipitated salt is filtered off with suction, and the toluene solution is washed a number of times with water and subsequently dried over sodium sulphate. In order to isolate the crude product, the toluene is removed by distillation under reduced pressure at about 30° C. The crude product is recrystallized a number of times from methanol.

Yield: 36.1% (86.4%)

m.p.: 86.6° to 87.3° C.

Monomer 4

Preparation of 4-[6-(2-methylpropenoyloxy)hexoxy] benzoic acid

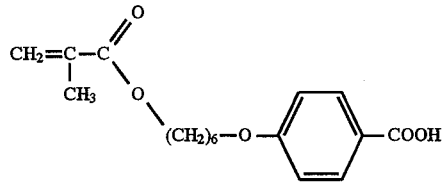

The synthesis is carried out analogously to the preparation of monomer 1, the requisite 4-(6-hydroxyhexyl)benzoic acid being prepared from 4-hydroxybenzoic acid and chlorohexanol.

Yield: 76[{]jf44aMonomer 5

Preparation of 3',4'-dimethoxyphenyl 4-[6-(2-methylpropenoyloxy)hexoxy]benzoate

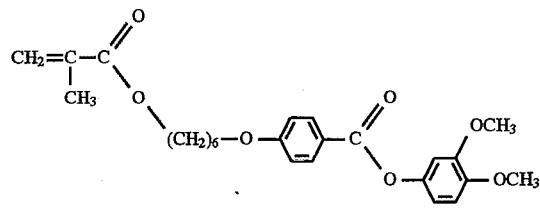

The synthesis is carried out analogously to the preparation of monomer 3 using monomer 4 and 3,4-dimethoxyphenol as precursors. Work-up is carried out firstly by recrystallization from methanol. If this does not give adequate purity, the product is transferred onto a silica gel column. The eluent used is methylene chloride. Fractions containing the product are evaporated under reduced pressure and subsequently added dropwise with stirring to n-hexane, during which the product precipitates in pure form.

Yield: 42.4% m.p.: 77.5° to 78° C.

Monomer 6

Preparation of p-(6-bromohexoxy)azobenzene

A mixture of 454 g. (1.86 mol) of dibromohexane, 128.5 g of potassium carbonate and about 0.2 g of potassium iodide in 460 ml of acetone is heated to the boil. A solution of 36.9 g. (0.186 mol) of p-hydroxyazobenzene in 330 ml of acetone is then added in several portions. In order to prevent delays in boiling, the mixture is stirred constantly. After about 4.5 hours, the reaction is terminated, the still-hot solution is filtered, and a little dye is washed out of the filtered-off inorganic salts using a little acetone. The acetone is removed from the solution under slightly reduced pressure. The excess dibromohexane is subsequently removed in an oil-pump vacuum.

The orange crude product is recrystallized twice from 2 l of hot methanol in each case. The pure end product is yellow.

Yield: 49.2 g. (63.8%) m.p.: 71.5° C.

Monomer 7

Preparation of 4-[6-(2-methylpropenoyloxy)hexoxy] azobenzene

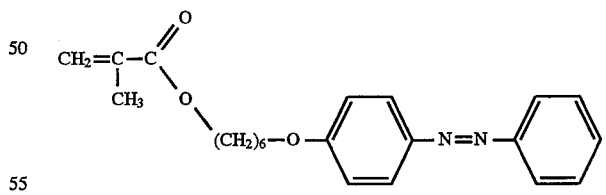

4.34 g. (0.035 mol) of potassium methacrylate are introduced into 250 ml of DMF and warmed to 70° C. Not until during the reaction does all the salt dissolve. Monomer 6 (7.23 g., 0.02 mol) is added to the saturated, hot salt solution in several portions. The reaction is terminated by pouring into ice water. After standing overnight, the mixture is filtered and dried over calcium chloride under reduced pressure. The product is recrystallized from 500 ml of n-hexane.

Yield: 5.1 g. (69.6%) m.p.: 86.5° C.

Polymers 2 to 4

Procedure for the homo- or copolymerization of monomers 3 and 7.

A 10% strength solution of the respective monomer or of the corresponding comonomers is polymerized over the course of 24 hours at 65° C. in benzene or THF in the presence of 1 mol % of azobisisobutyronitrile. Oxygen is excluded using the usual methods in free-radical polymerization. The reaction is terminated by pouring the solution into a ten-fold amount of methanol.

After standing overnight, the precipitate is filtered off and purified at least twice from THF by precipitation in ethanol. The purity criterion is the freedom from monomers as evidenced by gel permeation chromatography. The polymer is dried at from 30° to 40° C. in vacuo.

The properties of the polymers are shown in Tables 1 and 2:

TABLE 1

| Polymer | Monomer/amount | Monomer/amount | yield* (%) |
|---|---|---|---|
| 2 | 3<br>100% | — | 82.5 |
| 3 | 7<br>100% | — | 76.4 |
| 4 | 7<br>40% | 3<br>60% | 76,8 |

*)after reprecipitation twice

TABLE 2

| Polymer | Mw | E** | phase sequence*** |
|---|---|---|---|
| 2 | 190 000 | 2.1 | g 50.– |
| 3 | 110 000 | 2.0 | g 49 $S_A$ 65.– |
| 4 | 170 000 | 2.1 | g 48 i |

**)Uniformity E = Mw/Mn
***)Phases from DSC, X-ray diffraction, polarizing microscopy

Monomer 8

Preparation of 4-(6-hydroxyhexoxy)-3-methoxybenzoic acid

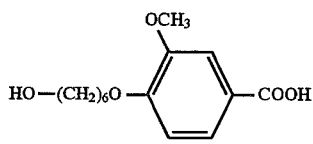

50 g. (0.3 mol) of 4-hydroxy-3-methoxybenzoic acid are suspended in a mixture of 100 ml of ethanol and 100 ml of water in a 750 ml sulphonation flask fitted with stirrer, reflux condenser, internal thermometer and dropping funnel. A solution of 45 g. (0.8mol) of potassium hydroxide in 45 ml of water is added dropwise with stirring. The solution is heated to the boil, and about 0.1 g of potassium iodide is added. 45.1 g. (0.33 mol) of 6-chlorohexanol are then added dropwise over the course of 45 minutes under reflux. The mixture is refluxed for a further 24 hours. After 24 hours, starting material can no longer be detected by thin-layer chromatography.

The cooled reaction solution is acidified using acetic acid and evaporated on a rotary evaporator. A solution of 5 g of potassium hydroxide in 400 ml of water is added to the red-brown crystal, the mixture is warmed gently and then washed by shaking 4 times with 60 ml of ether in each case. The product is precipitated from the aqueous phase by acidification using acetic acid. Filtration, washing with water and drying at 60° C. give 63.2 g of crude product. Reprecipitation from 600 ml of methanol gives beige crystals which are pure according to thin-layer chromatography.

Yield: 50.4 g. (62.2%)

m.p.: 133° C.

Monomer 9

Preparation of 4-methoxyphenyl 3-methoxy-4-(6-methacryloyloxyhexoxy)benzoate

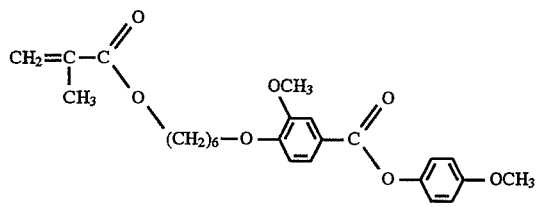

29.6 g. (0.088 mol) of 3-methoxy-4-(6-methacryloyloxyhexoxy)benzoic acid, about 0.5 g of 2,6-di-tert-butylphenol and 5 drops of N,N-dimethylformamide are introduced under nitrogen into a 250 ml round-bottom flask which has been dried by heating in vacuo.

105.6 g. (0.888 mol) of thionyl chloride are added dropwise over the course of 15 minutes with stirring. Further stirring gives a clear solution, from which, after 30 minutes at 40° C., excess thionyl chloride is removed by distillation in a rotary evaporator. 50 ml of dry tetrahydrofuran is added and the mixture evaporated, and this procedure is repeated. The crude product is employed in the subsequent reaction without purification.

5.16 g. (0.044 mol) of 4-methoxyphenol and 6.68 g. (0.066 mol) of triethylamine are introduced into 100 ml of dry toluene in a 50 ml round-bottom flask. A solution of 15.5 g. (0.044 mol) of the acid chloride in 50 ml of toluene is added dropwise with stirring over the course of 45 minutes at 25° C. The mixture is stirred for 3 hours at 55° C. and for a further 16 hours at room temperature, then evaporated at 40° C. in a rotary evaporator, and the solid residue is taken up in 100 ml of chloroform. The organic phase is washed by shaking 4 times with 100 ml of water. After drying over sodium sulphate, the mixture is evaporated in vacuo. The residue is washed by shaking five times with 300 ml of boiling n-hexane in each case and crystallized in the freezer, giving 9.6 g of crude product. The crystals are purified on a silica gel column using methylene chloride as eluent. Final impurities are removed by reprecipitation from methanol.

Yield: 5.3 g. (27.6%)

m.p.: 83.7° to 84.5° C.

Monomer 10

Preparation of biphenylyl 3methoxy-4-(6-methacryloyloxyhexoxy)benzoate

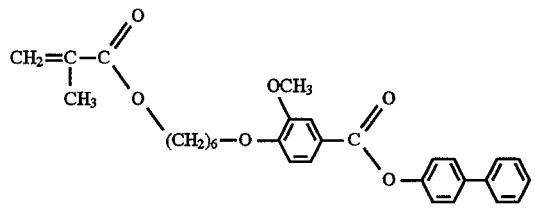

The benzoyl chloride is prepared analogously to the procedure described for monomer 9.

15.6 g. (0.044 mol) of 3-methoxy-4-(6-methacryloyloxyhexoxy)benzoyl chloride are introduced into 50 ml of dry toluene. A solution of 7.49 g. (0.044 mol) of 4-hydroxybiphenyl, 6.68g. (0.066 mol) of triethylamine and 100 ml of toluene is added dropwise. After 3 hours at 55° C., 16.3 g of crude product are present in the form of shimmering white needles. The product is purified by column chromatography.

Yield: 10.8 g. (50.3%)
m.p.: 98.5° to 99.5° C.

Polymers 5 to 12

Homo- and copolymerization of monomers 7, 9 and 10

The polymerization follows the procedure for the preparation of polymers 2 to 4. The properties of the homopolymers and copolymers are summarized in Tables 3 and 4.

TABLE 3

| Example | Monomer/proportion (mol %) | Monomer/proportion (mol %) | Yield (%) |
|---|---|---|---|
| 5 | 9 100 | — | 78.5 |
| 6 | 9 75 | 7 25 | 76.4 |
| 7 | 9 50 | 7 50 | 72.6 |
| 8 | 9 25 | 7 75 | 74.5 |
| 9 | 10 100 | — | 82.2 |
| 10 | 10 75 | 7 25 | 79.9 |
| 11 | 10 50 | 7 50 | 81.1 |
| 12 | 10 25 | 7 75 | 79.6 |

TABLE 4

| Example | Mw | E | Phase sequence/°C. |
|---|---|---|---|
| 5 | 220 000 | 2.5 | g 49 i |
| 6 | 170 000 | 2.4 | g 42 i |
| 7 | 260 000 | 2.5 | g 43 i |
| 8 | 100 000 | 1.8 | g 45 i |
| 9 | 200 000 | 2.2 | g 65 n 83 i |
| 10 | 190 000 | 2.5 | g 60 i |
| 11 | 190 000 | 2.5 | g 54 i |
| 12 | 110 000 | 2.0 | g 50 i |

The above mentioned preferred monomers of the side group (I) can be combined with the monomers 1–5, 9, and 10 and with the above mentioned preferred monomers of the side group (II) to copolymers in an analogous manner.

What is claimed is:

1. A polymer having a poly(meth)acryloyl main chain acting as backbone and, branching off therefrom, at least one covalently bonded photochromic side group of the structure of the following formula:

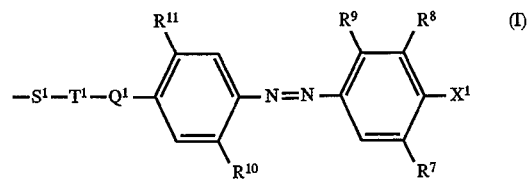

at least one covalently bonded non-photochromatic structure of the following formula:

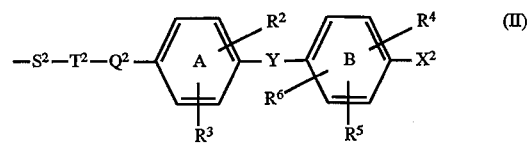

in which $S^1$ and $S^2$ independently of one another are O or S atoms or the $NR^1$ radical, $R^1$ is hydrogen, $C_1$–$C_6$-alkyl or phenyl, $T^1$ and $T^2$ independently of one another are the $(CR^1, R^{12})_n$ radical, which can optionally be interrupted by —O—, —S—, —$NR^1$—or —$OSiR^1{}_2O$—, n is an integer from 2 to 12, $Q^1$ and $Q^2$ independently of one another are —O—,—COO—,—OCO—, —$CONR^1$—, —$NR^1CO$—,—$NR^1$—, —O—$C_6H_4$—COO—or —O—$C_6H_4$—$CONR^1$—, whereby additionally the combinations $S^1R^1Q^1$ and $S^2T^2Q^2$ independently of one another can be

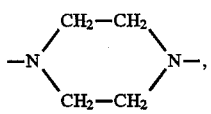

$R^2$ to $R^6$ independently of one another are hydrogen, halogen, $C_1$–$C_4$-alkyl, $C_1$–$C_4$-alkoxy, $CF_3$, nitro, $SO_2CH_3$, $SO_2NH_2$ or cyano, where at least one of the substituents $R^2$ to $R^6$ must be other than hydrogen, $R^7$ to $R^9$ independently of one another are hydrogen, $C_1$–$C_6$-alkyl, hydroxyl, $C_1$–$C_6$-alkoxy, phenoxy, $C_1$–$C_6$-alkylthio, phenylthio, halogen, $CF_3$, $CCl_3$, $CBr_3$, nitro, cyan, $C_1$–$C_6$alkylsulfonyl, phenylsulfonyl, $COOR^1$, aminosulfonyl, $C_1$–$C_6$- alkylaminosulfonyl, phenylaminosulfonyl, aminocarbonyl, $C_1$–$C_6$-alkylaminocarbonyl, phenylaminocarbonyl, $R^{10}$ is hydrogen, halogen, $C_1$–$C_6$-alkyl, hydroxyl, $C_1$–$C_6$-alkoxy, phenoxy, $C_1$–$C_4$-acylamino, $C_1$–$C_4$-alkylsulfonylamino, $R^{11}$ is hydrogen, halogen, $C_1$–$C_6$-alkyl, hydroxyl, $C_1$–$C_6$-alkoxy, phenoxy, Y is a direct bonding, —COO—, —OCO—, —CONH—, —NHCO—, —O—, —NH— or —N($CH_3$)— and $X^1$ and $X^2$ independently of one another are hydrogen, hydroxyl, mercapto, $CF_3$, $CCl_3$, $CBr_3$, halogen, cyan, nitro, $COOR_1$, $C_1$–$C_6$-alkyl, $C_5$–$C_{12}$-cycloalkyl, $C_1$–$C_{12}$-alkoxy, $C_1$–$C_{12}$- alkylthio, $C_6$–$C_{12}$-aryl, $C_6$–$C_{12}$-aryloxy, $C_6$–$C_{12}$arylthio, $C_1$–$C_6$alkylsulfonyl, $C_6$–$C_{12}$–arylsulfonyl, aminosulfonyl alkylaminosulfonyl, phenylaminosulfonyl, aminocarbonyl, $C_1$–$C_6$-alkylaminocarbonyl, phenylaminocarbonyl, $N(R^{12},R^{13})$, $NH—CO—R^{12}$, $NH—SO_2—R^{12}$, $NH—CO—N—(R^1,R^2)$, $NH—CO—O—R^{12}$ or $SO_2—CF_3$, wherein $R^{12}$ and $R^{13}$ independently of one another are hydrogen, $C_1$–$C_4$-alkyl or phenyl, with the proviso that, if $R^7$ to $R^{11}$ denote hydrogen and ring B is substituted by $C_1$–$C_4$-alkyl, $C_1$–$C_4$-alkoxy, nitro or cyano, at least one second substituent is also present in the ring A —Y— ring B system.

2. The polymer of claim 1, in which n is an integer from 4 to 8.

3. The polymer of claim 2, in which n is 6.

4. The polymer of claim 1, in which the recurring units conform to the formulae

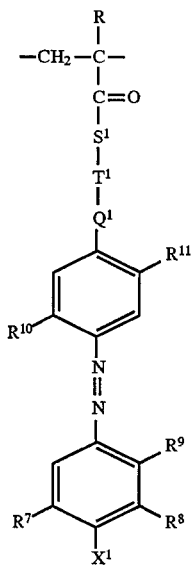

(III)

and

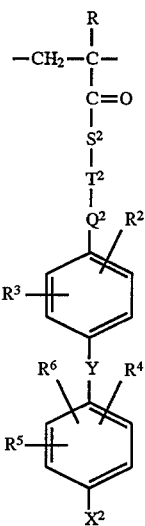

(IV)

in which R is H or methyl and $S^1$, $S^2$, $T^1$, $T^2$, $Q^1$, $Q^2$, $X^1$, $X^2$, Y and $R^2$ to, $R^{11}$ are as defined in claim 1.

5. The polymer of claim 1, in which, in the presence of side chains of the structure (I) and (II) at least one of the groups $Q^l$ and $Q^2$ has the meaning of —O—$C_6H_4$—COO— or —O—$C_6H_4$—$CONR^1$—.

6. The polymer of claim 1, in which the groups $T^1$ and $T^2$ independently of one another denote —(—$CH_2$—)$_n$—, —(—$CH_2$—)$_m$—$CH(CH_3)$—(—$CH_2$—)$_o$—, —(—$CH_2$—)$_m$—$C(CH_3)_2$—(—$CH_2$) —$_o$13 , —(—$CH_2$—)$_m$—O—(—$CH_2$)$_o$— and —(—$CH_2$—)$_m$—$N(CH_3)$—(—$CH_2$—)$_o$—, wherein n is an integer from 2 to 6, and m and o indpendently of one another are integers from zero to 2, the sum of which is at least 1.

7. Optical components containing polymers of claim 1.

* * * * *

UNITED STATES PATENT AND TRADEMARK OFFICE
CERTIFICATE OF CORRECTION

PATENT NO. : 5,641,846
DATED : June 24, 1997
INVENTOR(S) : Bieringer, et al.

It is certified that error appears in the above-indentified patent and that said Letters Patent is hereby corrected as shown below:

Col. 18, line 66, Delete " $COOR_1$ " and substitute -- $COOR^1$ --

Col. 19, line 2 After " aminosulfonyl, " insert -- $C_1-C_6-$ --

Col. 20, line 34 Delete " $-_O^{13}$ " and substitute -- $O^-$ --

Signed and Sealed this

Seventeenth Day of February, 1998

Attest:

BRUCE LEHMAN

*Attesting Officer*     *Commissioner of Patents and Trademarks*